F. W. ENGSTRÖM.
MACHINE FOR MOLDING THREADED OBJECTS.
APPLICATION FILED APR. 2, 1909.
961,944.
Patented June 21, 1910.
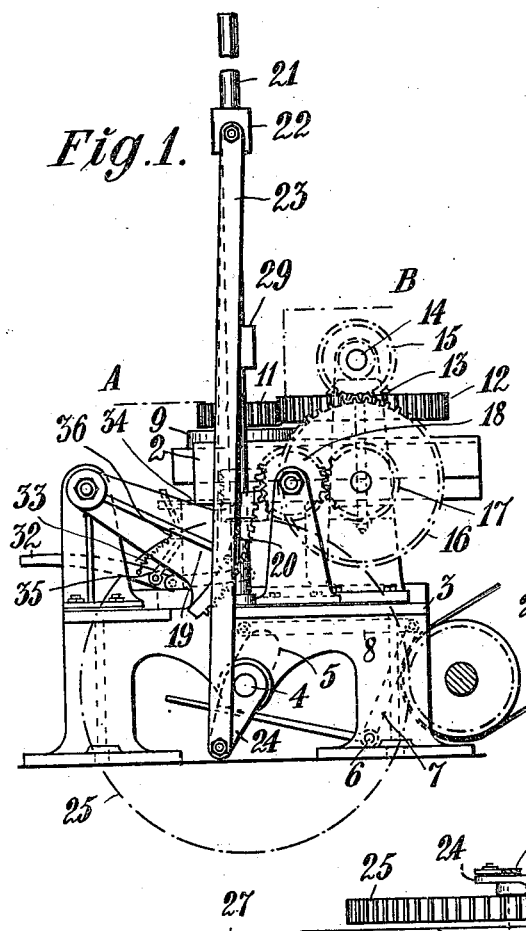
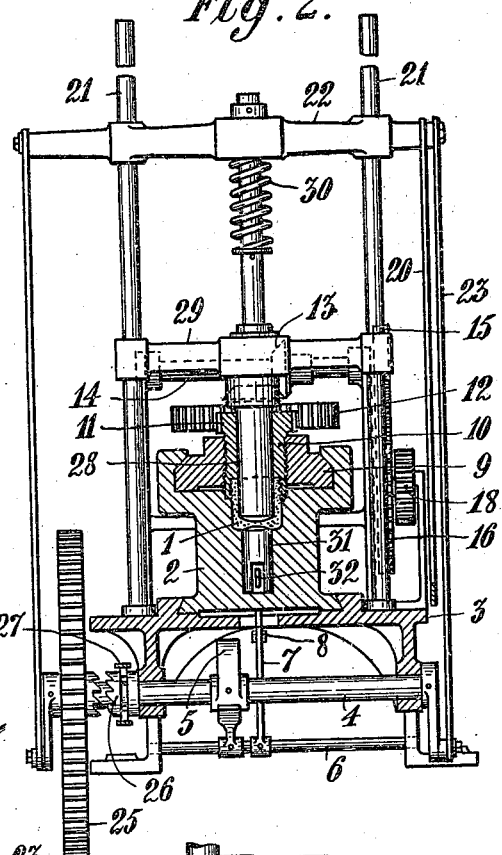
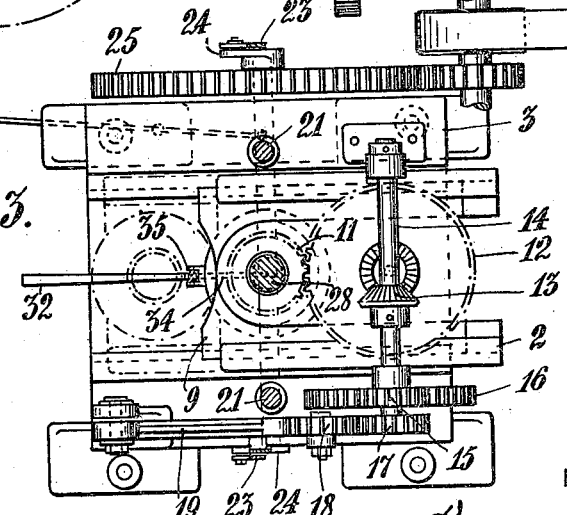
WITNESSES:
INVENTOR:

UNITED STATES PATENT OFFICE.

FRANS WILHELM ENGSTRÖM, OF NYBRO, SWEDEN.

MACHINE FOR MOLDING THREADED OBJECTS.

961,944.  Specification of Letters Patent. Patented June 21, 1910.

Application filed April 2, 1909. Serial No. 487,424.

*To all whom it may concern:*

Be it known that I, FRANS WILHELM ENGSTRÖM, a subject of the King of Sweden, residing at Nybro, in the Kingdom of Sweden, have invented new and useful Improvements in Machines for Molding Threaded Objects, of which the following is a specification, reference being had to the drawing accompanying and forming a part hereof.

This invention relates to machines for manufacturing pots, jars, bottles and other objects provided exteriorly or interiorly with threads for receiving a correspondingly threaded cover, suitably of pressed sheet-metal, and the invention more particularly relates to the manufacturing of such objects of glass or other material adapted to be worked in molds.

Machines of this kind in which one mold part is adapted to be screwed axially toward and away from another part of the mold, and in which a press plunger is mounted in the one mold part in such a manner as to be able to move axially into and out of the mold, are before known, but they do not work entirely automatically, several manipulations being required, during working, in order to cause the different movements to take place in the desired sequence.

The chief object of the invention is to avoid the said drawback and provide a machine having a considerably increased producing capacity making it possible to decrease the cost of manufacturing the articles to be produced.

Further objects will hereinafter appear.

The invention consists, chiefly, in that the axially movable mold part and the press plunger are connected to the driving means in such a manner that the reversal of the movements of the several parts will take place automatically so that in working the machine no other manual operations are to be performed than the pouring of the molten material into the molds and the removal of the molded objects.

The invention further comprises the construction and combination of parts hereinafter more particularly described.

In the drawing, I have shown a machine embodying the invention.

Figure 1 is a side-view of the machine, Fig. 2 is a front view of the same, partly in section, and Fig. 3 is a plan view of the machine (partial section on line A—B of Fig. 1.)

Referring to the drawing, the apparatus shown is used for molding common smooth cylindrical glass-pots of the cross-section shown in Fig. 2, where the glass-pot has the reference numeral 1. The pot is shown provided at the top with exterior threads for screwing on a cover. The part of the mold corresponding to the smooth part of the pot below the threads is formed in a slide 2 adapted to be reciprocated in a guide formed in the machine frame 3. The movement of the slide is suitably produced by means of a cam 5 or the like attached to or made integral with the driving shaft, said cam acting on the one arm of an angle lever 7 fulcrumed at 6, the other arm of said angle lever being connected to the slide 2 by means of a link 8, or otherwise. The slide is guided at the top by a stationary part 9 of the machine frame. Screwed through the said part 9, from the top downward, is the threaded part 10 of the mold, the upper part of which forms a spur-wheel 11 adapted to be turned by any suitable means. In the embodiment shown the spur-wheel 11 is engaged by a spur-wheel 12 journaled at the part 9 of the machine frame, said latter wheel being rotated from shaft 14 by means of a bevel gear 13. The shaft 14 is rotated by spur-wheels 15, 16, 17, 18 from a swinging cog-segment 19 (Figs. 1 and 3). The cog-segment 19 is connected by a connecting rod 20 to a cross-piece 22 movable on guides 21, said cross-piece being connected by connecting rods 23 and cranks 24 to the rotary shaft 4. The latter is rotated by means of a large spur-wheel 25 which is suitably loosely placed on the shaft 4 to which it may be connected by a clutch-part 26 movable along the shaft 4 by means of a lever 27. It appears from the aforesaid that, when the cog-segment 19 engaging the spur-wheel 18 is turned, the upper part 10 of the mold is turned and at the same time screwed within the part 9, so that, when the cog-segment is swung downward, the part 10 is screwed on to the lower mold part 2. The relation is such that, when the part 10 has been screwed in to the part 2, the cog-segment 19 releases the spur-wheel 18, by which, as easily understood, the part 10 is left at rest. This takes place a certain time before the cranks 24 have arrived at their lowermost dead point position, and from that moment the upper mold part 10 and its whole driving mechanism is at rest while the plunger 28 connected to the cross-piece 22 and passing through the mold part 10 continues downward and descends into the liquid mass within the closed mold so that the said mass is forced into all parts of the mold and fills the same at the same time as the plunger forms the inner cavity of the pot 1. For accurately guiding the plunger during its movement a further cross-piece 29 is provided running on the guides 21, and, in order to provide for a resilient movement, when the cranks 24 pass their lower dead point positions, the cross-piece 22 is loosely placed on the plunger bar and supported by a spring 30 placed on the said bar. This spring has also the very important function of accommodating the movement of the plunger 28 if too large or too small a mass of glass has been filled into the mold. Thus, for instance, if too large a quantity of glass has been filled in, the springy plunger yields, whereas, in case it were not springy it would be pressed in so as to destroy both the glass object and the mold. If, on the other side, too small a mass of glass has been filled in, the spring causes the plunger to penetrate so far into the mold that the latter is completely filled. The yielding connection is especially advantageous when the machine has two or more plungers and molds, it being obviously impossible to always fill the molds quite uniformly.

When the cranks 24 during their continued rotation move upward from their lower dead point position, the cog-segment 19 again enters into engagement with the wheel 18, whereby the mold part 10 is turned in the opposite direction, i. e. it is screwed away from the mold part 2, thereby following the cast threads of the glass-pot 1. At the same time the plunger 28 moves upward, and when the upper mold part and the plunger have both arrived in positions quite above the glass-pot 1, the cam 5 acts on the lever 7 so that the lower mold part 2 with the glass-pot placed in it is moved forward into a position in which the glass-pot may be removed. To this end the lower mold part 2 has placed into it, just below the mold, a piston 31 supported at its lower end by means of a lever 32 adapted to press the piston upward through the bottom of the mold. The other arm of the lever 32 projects forwardly and is connected to a spring 33 tending to swing the said arm upwardly. By pressing down the outer arm of the lever the piston 31 and thereby the glass-pot is raised.

In order that the glass-pot placed in the mold shall not turn with the upper part of the mold, when the latter is screwed upward, the lower mold part has projecting into it a laterally movable pin 34 the inner end of which projects into the mold and thus into the outer side of the cast glass-pot. The pin 34 must thus be retracted before the pot can be pressed out of the mold. To this end the outer end of the pin is provided with an oblong slot, and projecting through the said slot is the upper, obliquely extending end of a bar 35 the lower end of which is pivotally attached to the lever 32. The bar 35 is suitably guided in a part 36 attached to the front side of the lower mold part 2. When the lever 32 is depressed, the bar 35 is moved downward and thereby acts with its upper, obliquely extending part on the pin 34 so that the latter is retracted before the piston 31 raises the cast glass-pot.

In order to increase the productivity of the machine, two or more molds constructed and arranged substantially as hereinbefore described may be employed.

Though in the embodiment described I have shown the threaded mold part arranged to be screwed down upon the other mold part, it is obvious that the firstmentioned mold part may be stationary and the other mold part arranged to be screwed into close contact with the former, the essential feature being that the two mold parts are arranged in such a manner that a relative movement may be imparted to the same equivalent to that hereinbefore described, the pitch of the screwing movement being in any case equal to the pitch of the threads of the mold or the object to be molded.

I claim:

1. A machine for molding threaded objects, comprising a mold part adapted to receive the non-threaded part of the object to be produced, a threaded mold part adapted to receive the threaded part of the said object, means comprising a set of gear-wheels for screwing the said latter mold part into close contact with the former, a plunger movable through the threaded mold part into and out of the mold, said plunger forming a core for the object to be molded, a swinging segment engaging one of the said gear-wheels during a part of its swinging movement, and a connection between the said segment and the plunger causing the latter to move farther into the mold after the segment has moved, in a certain direction, out of engagement with its corresponding gear wheel.

2. A machine for molding threaded objects, comprising a slide containing a mold part adapted to receive the non-threaded part of the object to be produced, a threaded mold part adapted to receive the threaded part of the said object, means for screwing the said mold parts into close contact with each other, a plunger movable through the threaded mold part into and out of the mold, means for causing the said plunger to move in such a manner that, when the mold parts have been screwed together, the plunger moves farther into the mold and presses the mass therein into all parts of the same, and means for automatically imparting to the slide containing the non-threaded mold part a lateral movement in relation to the other mold part, when the latter and the plunger have been entirely retracted.

3. A machine for molding threaded objects, comprising a slide containing a mold part adapted to receive the non-threaded part of the object to be produced, a threaded mold part adapted to receive the threaded part of the said object, means for screwing the said mold parts into close contact with each other, a plunger movable through the threaded mold part into and out of the mold, means for causing the said plunger to move in such a manner that, when the mold parts have been screwed together, the plunger moves farther into the mold and presses the mass therein into all parts of the same, means for moving the slide containing the non-threaded mold part laterally in relation to the other mold part when the latter and the plunger have been entirely retracted, a piston placed in the slide, below the mold, and adapted to be moved into and out of the said mold, the end of the piston forming the bottom of the said mold, and means for moving the said piston into the mold and thereby pressing out the molded object when the slide has been moved laterally in relation to the retracted plunger.

4. A machine for molding threaded objects, comprising a mold part adapted to receive the non-threaded part of the object to be produced, a threaded mold part adapted to receive the threaded part of the said object, means for screwing the said mold parts into close contact with each other, a plunger movable through the threaded mold part into and out of the mold, means for causing the said plunger to move in such a manner that, when the mold parts have been screwed together, the plunger moves farther into the mold and presses the mass therein into all parts of the mold, and a pin movably mounted in a passage in the wall of the non-threaded mold part and adapted to project with its inner end into the mold.

5. A machine for molding threaded objects, comprising a slide containing a mold part adapted to receive the non-threaded part of the object to be produced, a threaded mold part adapted to receive the threaded part of the said object, means for screwing the said mold parts into close contact with each other, a plunger movable through the threaded mold part into and out of the mold, means for causing the said plunger to move in such a manner that, when the mold parts have been screwed together, the plunger moves farther into the mold and presses the mass therein into all parts of the same, means for moving the slide containing the non-threaded mold part laterally in relation to the other mold part when the latter and the plunger have been entirely retracted, a piston placed in the slide, below the mold, and adapted to be moved into and out of the said mold, the end of the piston forming the bottom of the said mold, a pin movably mounted in a passage in the wall of the slide and adapted to project with its inner end into the mold, a bar mounted on the slide in such a manner as to be able to move at an angle to the said pin, said bar engaging the pin so as to pull it out of the mold, when the bar is operated, and means for operating the said bar and the bottom piston of the mold, when the slide has been moved laterally in relation to the retracted plunger, so that the pin is first withdrawn from the mold and the piston is thereupon raised to press the molded object out of the mold.

FRANS WILHELM ENGSTRÖM.

Witnesses:
 AUG. SÖRENSEN,
 FREDR. NORDSJD.